April 23, 1968        D. D. MEEHAN        3,379,403
MOUNTING MEANS FOR PERIPHERAL VISION MIRRORS
Filed Aug. 8, 1966
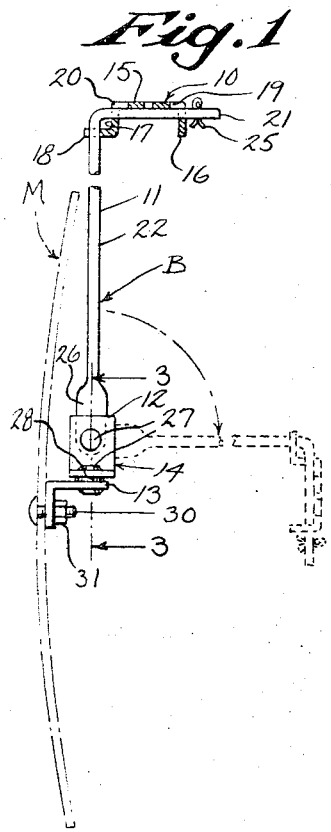
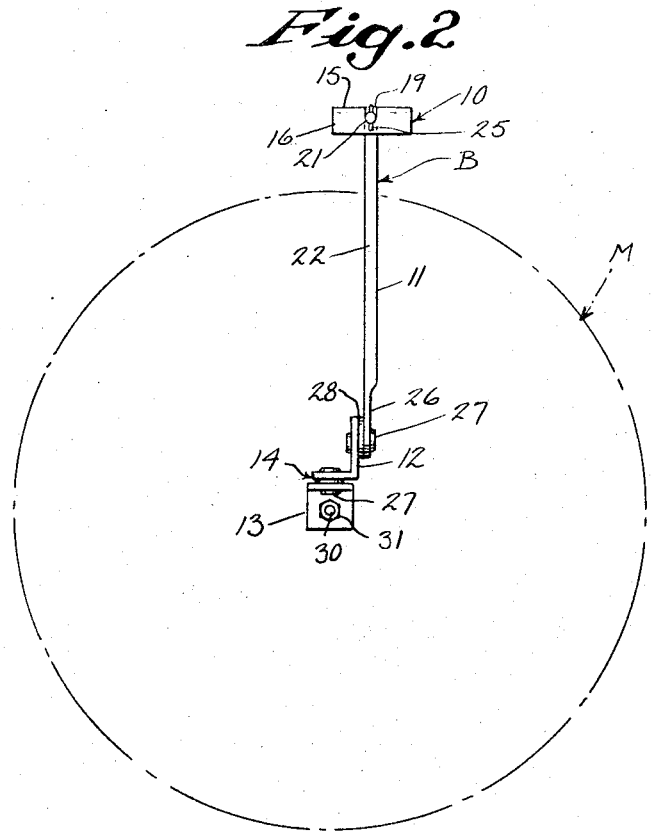
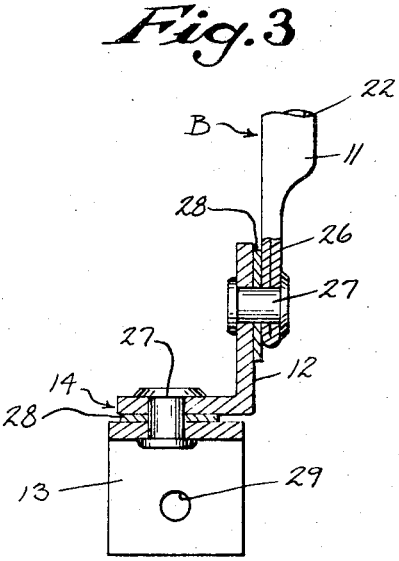
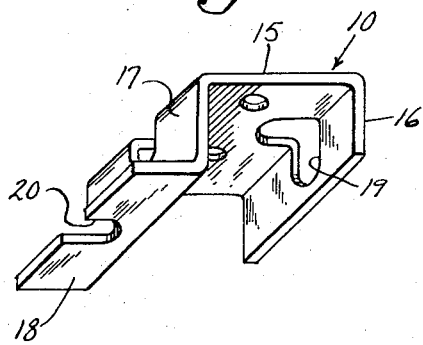
INVENTOR
DAVID D. MEEHAN
BY
GEORGE W. WRIGHT, JR.

United States Patent Office 3,379,403
Patented Apr. 23, 1968

3,379,403
MOUNTING MEANS FOR PERIPHERAL
VISION MIRRORS
David D. Meehan, 401 9th St.,
Manitowoc, Wis. 54220
Filed Aug. 8, 1966, Ser. No. 570,936
5 Claims. (Cl. 248—487)

This invention appertains to mirrors and detecting devices, and more particularly to a new and novel means for mounting said mirrors to either horizontal or vertical supports.

It has become the practice, particularly in self-service types of merchandising to position mirrors of a concave-convex shape, i.e., of the so-called "peripheral vision" type, at various locations in a building, so that a very wide range of vision is had. Not only are these mirrors utilized for traffic movement and regulation throughout the building or floor, but they are also utilized to detect pilfering and the like, since as above mentioned, these mirrors take in a large area and therefore an extremely large area can be observed at one time.

There has been a problem in the past, however, in mounting these mirrors at the desired location, since the mounting brackets have been limited and generally speaking the best place for locating the mirror may not be suited to the particular mounting bracket provided.

It is, therefore, a primary object of my present invention to provide a novel means for mounting a mirror of the so-called "peripheral vision" type, in almost any desired, selected location.

Another important object of my present invention is to provide a novel mounting plate which can be positioned either on a horizontal surface, i.e., ceiling, or on a vertical surface, i.e., wall, post or the like, and wherein the mounting bracket can be adjusted to position the mirror in any needed position.

Another important object of my present invention is to provide a novel universal type mounting for a peripheral vision mirror wherein the mirror is secured to an angle leaf of the swivel bracket at its axial center by a chrome bolt so that the mirror can be easily replaced and can be adjusted for maximum vision.

Still another object of my present invention is to provide a novel universal swivel bracket for mounting peripheral vision mirrors which can be utilized not only on ceilings and walls, but which can be pivotally secured to hollow tubes and posts.

A further object of the present invention is to provide a simple, practical and reliable construction that is easy to assemble, economical to manufacture and positive in its operation.

With the above and other objects in view, that will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which, FIGURE 1 is a side elevational view in perspective illustrating one position of a ceiling installation, the mounting plate being shown in section to illustrate details in its construction, and also showing in dotted lines one position of the swivel bracket and mirror in a vertical wall installation;

FIGURE 2 is a rear elevational view of the ceiling mounted installation in FIGURE 1 of the drawings in full lines;

FIGURE 3 is an enlarged fragmentary section through the swivel bracket taken on the line 3—3 of FIGURE 1 of the drawings and looking in the direction of the arrows; and FIGURE 4 is a side elevational view in perspective of the novel mounting plate.

Referring now to the drawings in detail, wherein similar reference characters designate corresponding parts throughout the several views, the letter B generally indicates the new and improved bracket mounting means for the mirror M and the same includes broadly a mounting plate 10, bracket arm 11 and a pair of identically formed pivoted leaf members 12 and 13 comprising the swivel bracket 14.

As previously mentioned, the novel bracket mounting means B is designed to mount the peripheral vision mirror M in any desired position, to a horizontal or vertical surface, or to a hollow post or tube. In full lines, I have shown one position for a ceiling installation. In any event, the mounting plate 10 is preferably formed from a flat strip of metal to provide the mounting panel 15, a pair of depending parallel walls 16 and 17 and a forwardly extending panel 18 which is generally parallel to the mounting panel 15. The mounting panel may be provided with a pair of spaced apertures for the reception of screws or other means for fastening the mounting plate to the supporting surface. Through the parallel depending walls 16 and 17 and also extending considerably into the mounting panel 15, I provide the L-shaped openings 19, the purpose of which will become more apparent, as the description proceeds. In alignment with the openings 19 in wall 18, I also provide a U-shaped opening or aperture 20. Bracket 11 is L-shaped as shown and may be formed from a solid metal rod or a hollow tube, as shown, to include a relatively short leg 21 and a longer leg member 22. The short leg 21 is received within the apertures 19 and a portion of the longer leg 22 is received in the U-shaped aperture 20 and to prevent the leg from becoming disengaged from the mounting plate I provide a simple cotter pin 25 as shown in FIGURES 1 and 2 of the drawings. Thus, it can be seen that the bracket 11 can be firmly held and secured to the mounting plate.

While I have illustraed the aperture 19 as extending well into the top mounting panel 15, it is obvious that apertures of the size and configuration of leg 21 could be formed through each of the walls 16 and 17 in alignment and accomplish the same purpose. The lower end of leg 22 is preferably provided with a flat surface 26 so that the leaf member 14 forming part of the swivel bracket assembly can be readily pivotally secured thereto. Thus, it can be seen that each of the leaf members 12 and 13 are identically formed L-shaped from a flat strip of metal and preferably one leg is slightly longer than the other leg. The longer leg therefore of leaf member 14 is, as previously mentioned, pivoted by means of a Nylon rivet assembly 27 to the flat portion 26 of leg 22 and inserted between the large leg and flat surface 26 is a fiber friction washer 28. The Nylon rivet or bearing 27 is preferably formed and secured so that there is considerable friction between the two pivot members and so that when leaf member 12 is pivoted in relation to the flat surface 26, it will stay in its pivoted and adjusted position. The larger leg of the leaf member 13 is then likewise pivoted to the short leg of leaf member 12, in an identical manner utilizing the Nylon rivet or pivot 27 and fiber washer 28. The shorter leg of leaf member 13 is provided with a suitable aperture 29 to receive the aforementioned chrome bolt 30 and its respective nut 31.

It is important to note that the chrome headed bolt 30 is received at the axial center of the peripheral vision mirror M, and thus does not interfere with the field of vision at all, but does firmly secure the mirror M to the swivel bracket assembly 14 so that it may be adjusted in any desired position. For example, the leaf member 12 is pivotally secured to the flat portion 26 of leg 22 so that it is in a plane of adjustment at right angles to the plane of adjustment or swivel of the larger leg or leaf member 13. This then, gives a substantially uniform adjustment for the mirror M.

Attention is now directed to the dotted line position of mounting bracket assembly in FIGURE 1, and this merely illustrates that if the mounting plate 10 were mounted on a vertical surface the bracket arm would be in the dotted line position and swivel bracket assembly 14 would be readily held in position by friction and gravity and mirror M could still be positioned as shown in dotted lines, and of course, if desired could be pivoted on a plane at right angles to the plane of the pivoting of leaf member 12. It should be noted that leg 22 of bracket arm 11 carrying swivel bracket assembly 14 is of substantially greater length than the radius of the mirror M. The reason for this is that the mirror M can be swivelled and adjusted to any desired position without contacting or interfering with leg 21 and mounting plate 10.

Again, it should be stressed that a very important feature of the present invention resides in the provision of an aperture at the axial center of the mirror for receiving the chrome headed bolt 30, and for securing the same to the appropriate leg of the second leaf member. This method of attachment eliminates the additional cost of hardboard backing on the mirror which was necessary for attaching standard type brackets to the mirror.

Therefore, it can be seen that I have provided a novel means for universally mounting a mirror of the peripheral vision type so that the same can be secured to almost any type of surface. The mounting plate is readily adapted to be secured to a ceiling or wall surface, i.e., either horizontal or vertical, and further, the short leg 21 of bracket 11 could be readily received within the upper end of a hollow upright tubular post (not shown).

Thus, while I have shown and described certain specific embodiments of the invention, it will be understood that these are merely for the purpose of illustration and description, that various other forms may be devised and that changes may be made in the proportions and minor details of construction without departing from the spirit of the invention, or scope of the appended claims.

What is claimed as new is:

1. A mounting means for peripheral vision mirrors of the concavo-convex type including an L-shaped bracket arm one leg of which is substantially longer than the other leg, a mounting plate for securing said short leg to a supporting surface, a swivel bracket assembly pivotally secured to the outer end termination of said longer leg, said swivel bracket assembly including a pair of identically formed L-shaped leaf members, one leaf member being pivoted to the outer end termination of said longer bracket leg of said bracket arm and having its other leg pivotally secured to said second leaf member, said mirror being mounted at its axial center to the opposite leg of said second leaf member.

2. A mounting means for peripheral vision mirrors as set forth in claim 1, wherein said mounting plate includes a flat stretch of metal bent to provide a mounting plate, depending end walls and a forwardly extending panel integral with one of said depending walls, said parallel walls each being provided with aligned apertures to receive the shorter leg of said bracket arm, and a U-shaped aperture in said forwardly extending panel receiving a respective portion of said bracket arm to firmly secure the same to said mounting plate.

3. A mounting means for peripheral vision mirrors as set forth in claim 1, wherein said leaf members are pivotally secured by means of nylon bearings and a fiber friction washer between said members so constructed and arranged as to retain a pivoted adjusted position.

4. A mounting means for peripheral vision mirrors as set forth in claim 1, wherein the radius of the mirror is less than the length of the larger leg of said bracket arm.

5. A mounting means for peripheral vision mirrors as set forth in claim 1, wherein means for mounting said mirror at its axial center to the opposite leg of said second leaf member includes, a chrome headed bolt received through an aperture provided in the axial center of said mirror and in alignment with a like aperture in said opposite leg of said second leaf member, whereby hardboard backing and the like for bracket mountings may be eliminated.

References Cited

UNITED STATES PATENTS

| | | | |
|---|---|---|---|
| 1,380,121 | 5/1921 | Stitzer | 248—278 X |
| 1,392,481 | 10/1921 | Colbert et al. | 248—487 |
| 2,149,597 | 3/1939 | Girl et al. | 248—487 X |

ROY D. FRAZIER, *Primary Examiner.*

F. DOMOTOR, *Assistant Examiner.*